(12) United States Patent
Braido et al.

(10) Patent No.: US 11,769,364 B2
(45) Date of Patent: *Sep. 26, 2023

(54) APPARATUS, METHODS AND SYSTEMS FOR STORING AND CONVEYING ITEMS WITHIN A FOOD DELIVERY APPARATUS

(71) Applicant: Roboburger Enterprises, Jersey City, NJ (US)

(72) Inventors: Daniel Braido, Jersey City, NJ (US); Audley Wilson, Jersey City, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 17/743,189

(22) Filed: May 12, 2022

(65) Prior Publication Data

US 2023/0018067 A1    Jan. 19, 2023

Related U.S. Application Data

(63) Continuation of application No. 17/375,038, filed on Jul. 14, 2021, now Pat. No. 11,335,154.

(51) Int. Cl.
*G07F 11/58* (2006.01)
*B65G 13/02* (2006.01)

(52) U.S. Cl.
CPC .............. *G07F 11/58* (2013.01); *B65G 13/02* (2013.01)

(58) Field of Classification Search
CPC ............ G07F 11/58; B65G 13/02; E04B 1/00
See application file for complete search history.

(56) References Cited

U.S. PATENT DOCUMENTS 5,820,237 A * 10/1998 Robey .................. A47B 49/002
312/139.2

10,144,595 B2 * 12/2018 Philipp .................. B65G 47/57
(Continued)

FOREIGN PATENT DOCUMENTS

DE         19604561        8/1997
DE     102018101068 A1    7/2019
(Continued)

OTHER PUBLICATIONS

Rimondi, An Apparatus for Automatic Dispensing of Products, in Particular Pharmaceutical and/or Parapharmaceutical Products, EP 3270360 A1 (Year: 2018).*

(Continued)

*Primary Examiner* — Gene O Crawford
*Assistant Examiner* — Lester Rushin, III
(74) *Attorney, Agent, or Firm* — Derek Fahey, Esq.; The IP Plus Firm, PLLC

(57) ABSTRACT

A cartridge having a housing, an outer looped element affixed at least partially in a cavity that spans substantially all of a length of the housing. A movable inner looped element is mounted a roller and positioned inside the outer looped element. Panels are radially attached to the movable inner looped element such that each of the plurality of panels extends toward the outer looped element. Movable chambers defined by a space between the panels. A first opening that spans substantially all of a first side of the outer looped element. A second opening is disposed on the outer looped element proximate to a bottom end of the outer looped element providing access to outside the cartridge. A second movable door covers substantially all of the second opening and partially defining the outer looped element when the second movable door is in a second movable door closed position.

14 Claims, 12 Drawing Sheets

(56) References Cited

U.S. PATENT DOCUMENTS

| | | | |
|---|---|---|---|
| 2004/0045975 A1* | 3/2004 | Leykin | G07F 9/105 221/150 R |
| 2016/0376102 A1* | 12/2016 | Cook, II | G07F 9/105 414/281 |
| 2017/0290345 A1 | 10/2017 | Garden et al. | |
| 2017/0365123 A1 | 12/2017 | Vareley et al. | |
| 2019/0059645 A1 | 2/2019 | Nelson et al. | |
| 2019/0075826 A1* | 3/2019 | Mohammed | A23L 3/045 |

FOREIGN PATENT DOCUMENTS

| | | |
|---|---|---|
| JP | H 7-227197 A | 8/1995 |
| WO | 2014131208 A1 | 2/2013 |

OTHER PUBLICATIONS

Bergsten, Variety Cartridge for a Vending Machine, SE 455548 B (Year: 1986).*

Maching english language translation of JP07227197A (Year: 1995).*

* cited by examiner

APPARATUS, METHODS AND SYSTEMS FOR STORING AND CONVEYING ITEMS WITHIN A FOOD DELIVERY APPARATUS

CROSS-REFERENCE TO RELATED APPLICATIONS

This application is a continuation that claims the benefit of U.S. Non-provisional Application Ser. No. 17/375,038 entitled "APPARTUS, METHODS AND SYSTEMS FOR STORING AND CONVEYING ITEMS WITHIN A FOOD DELIVERY APPARATUS" and filed Jul. 14, 2021 the subject matter of which is incorporated herein by reference.

STATEMENT REGARDING FEDERALLY SPONSORED RESEARCH OR DEVELOPMENT

Not applicable.

INCORPORATION BY REFERENCE OF MATERIAL SUBMITTED ON A COMPACT DISC

Not applicable.

TECHNICAL FIELD

The present invention relates to the field of food preparation, and more specifically to the field of automated food preparation devices.

BACKGROUND

Safe food supplies support national economies, trade and tourism, contribute to food and nutrition security, and underpin sustainable development. However, foodborne diseases encompassing a wide spectrum of illnesses are a growing public health problem worldwide. Foodborne diseases account for an estimated 76 million illnesses, 350,000 hospitalizations and 5,000 deaths every year in the United States, according to the Centers for Disease Control and Prevention. Moreover, according to the World Health Organization (WHO), an estimated 600 million people—almost 10 percent of the global population—fall ill after eating contaminated food.

Protecting the public from the degrees of the harmfulness of contaminated foods has become a daunting task. Automated food preparation devices are being increasingly used in the food industry as a means of preventing food contamination. Although automated food preparation devices have potential food safety benefits, such as the need for fewer workers and reducing the risk of contamination through manual handling, the implementation of suitable devices that prevent contamination is necessary.

In another aspect, automated food preparation devices inherently involve the transportation of food products. Transportation is another potential source of contamination that must be considered when designing automated food preparation devices. Given the impact of these human factors, there exists a need to improve over the prior art and more particularly, for devices that prevent contamination of food products.

SUMMARY

A cartridge to be used in a food delivery apparatus is disclosed. This Summary is provided to introduce a selection of disclosed concepts in a simplified form that are further described below in the Detailed Description including the drawings provided. This Summary is not intended to identify key features or essential features of the claimed subject matter. Nor is this Summary intended to be used to limit the claimed subject matter's scope.

In one embodiment, a cartridge to be used in a food delivery apparatus is disclosed. In one embodiment, the cartridge is for storing and conveying food items and comprises (a) a housing having a plurality of walls defining a main cavity, (b) an outer looped element affixed at least partially in the main cavity, (c) a plurality of rotatable rollers spaced apart from each other and positioned inside the outer looped element, (d) a movable inner looped element mounted on the plurality of rotatable rollers and positioned inside the outer looped element, (e) a plurality of panels, wherein a first end of each of the plurality of panels is radially attached to the movable inner looped element such that each of the plurality of panels extends toward the outer looped element, (f) a plurality of movable chambers between the outer looped element and the movable inner looped element, wherein each of the plurality of movable chambers is defined by a space between a first panel of the plurality of panels and an adjacent panel of the plurality of panels that is next to the first panel, (g) a first movable door at least partially covering a first opening, and (h) a second movable door disposed on the outer looped element that provides access to outside the cartridge.

In one embodiment, the cartridge comprises a motor that when powered rotates at least one of the plurality of rotatable rollers so that the movable inner looped element moves.

In one embodiment, the outer looped element is elongated and has a length that spans substantially all of a full length of the housing. In one embodiment, a least a portion of the outer looped element is rigid.

In one embodiment, the outer looped element has a height that spans from a first inside surface of a first side wall of one of the plurality of walls to a second inside surface of a second side wall of one of the plurality of walls.

In one embodiment, a second end of the plurality of panels is at least proximate to an inward facing looped wall of the outer looped element. In one embodiment, the second end of each of the panels abuts the inner side of the outer looped element such that each of the plurality of movable chambers is fully enclosed.

In one embodiment, the plurality of movable chambers is a hermetically sealed chamber. In one embodiment, the second movable door is disposed on the outer looped element proximate to a bottom end of the outer looped element.

Additional aspects of the disclosed embodiment will be set forth in part in the description which follows, and in part will be obvious from the description, or may be learned by practice of the disclosed embodiments. The aspects of the disclosed embodiments will be realized and attained by means of the elements and combinations particularly pointed out in the appended claims. It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. The embodiments illustrated herein are presently preferred, it being understood, however, that the invention is not limited to the precise arrangements and instrumentalities shown, wherein.

DETAILED DESCRIPTION

Figure 1A:
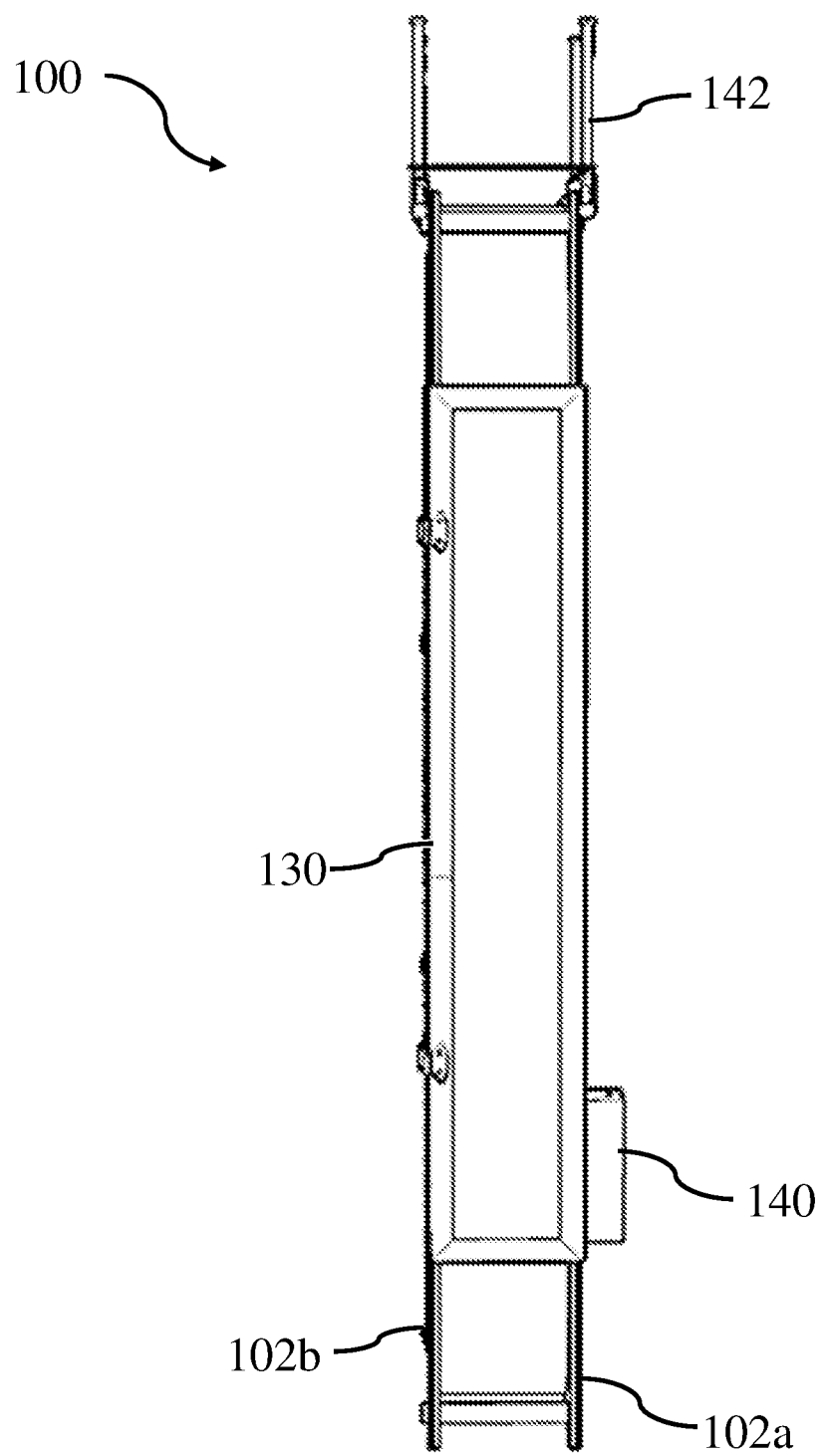
FIG. 1a is a front view of a cartridge for storing and conveying food items, according to an example embodiment.

The following detailed description refers to the accompanying drawings. Whenever possible, the same reference numbers are used in the drawings and the following description to refer to the same or similar elements. While disclosed embodiments may be described, modifications, adaptations, and other implementations are possible. For example, substitutions, additions or modifications may be made to the elements illustrated in the drawings, and the methods described herein may be modified by substituting reordering, or adding additional stages or components to the disclosed methods and devices. Accordingly, the following detailed description does not limit the disclosed embodiments. Instead, the proper scope of the disclosed embodiments is defined by the appended claims.

The disclosed embodiments improve upon the problems with the prior art by providing a cartridge that can readily be loaded in a food safe preparation area that is remote from the location of use for the cartridge. Furthermore, the cartridge is easily sanitized and maintains sanitary conditions throughout the food preparation process, from the food safe preparation area, and to the final location of the cartridge where it will be used. Lastly, the cartridge provides a hermetically sealed environment to protect the food items inside the cartridge from contamination.

Figure 1B:
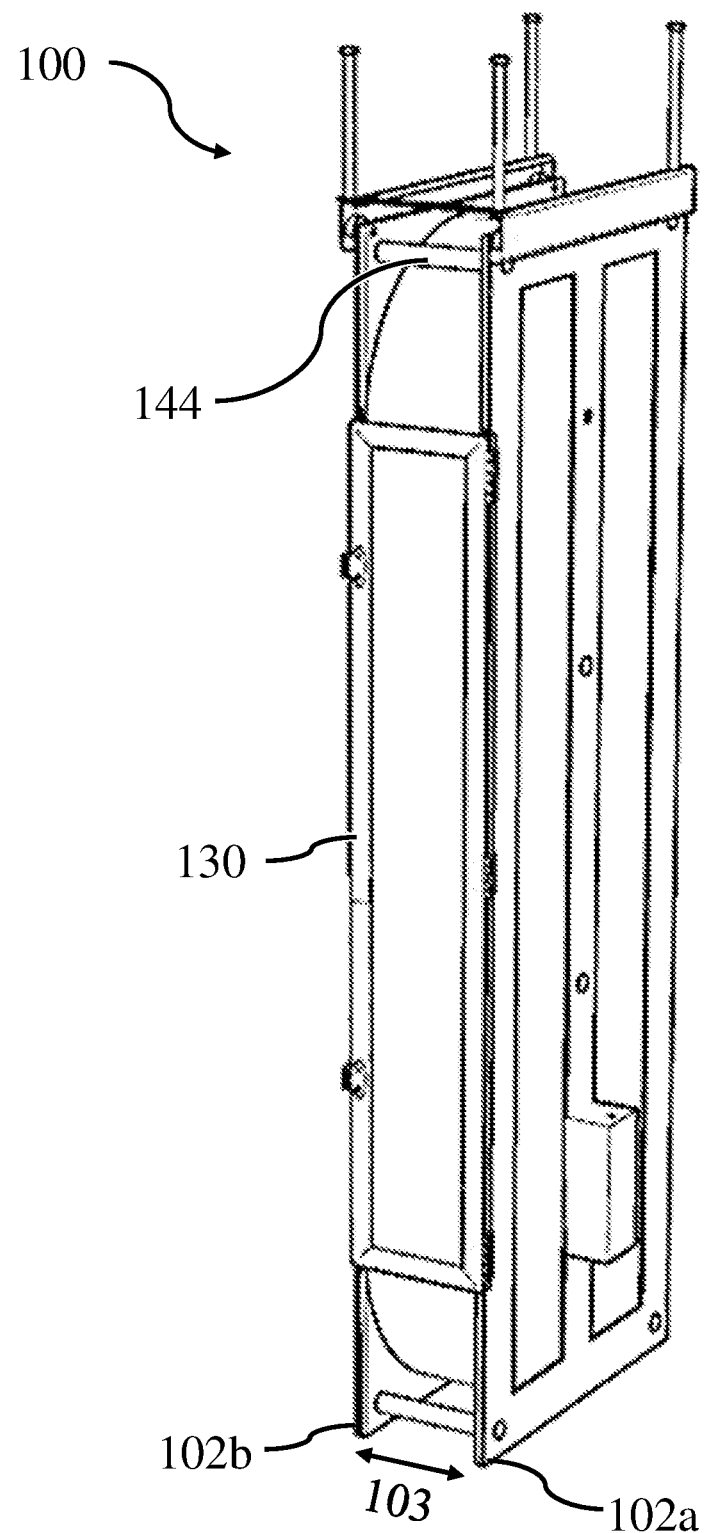
FIG. 1b is a perspective view of a cartridge for storing and conveying food items, according to an example embodiment.
Figure 1C:
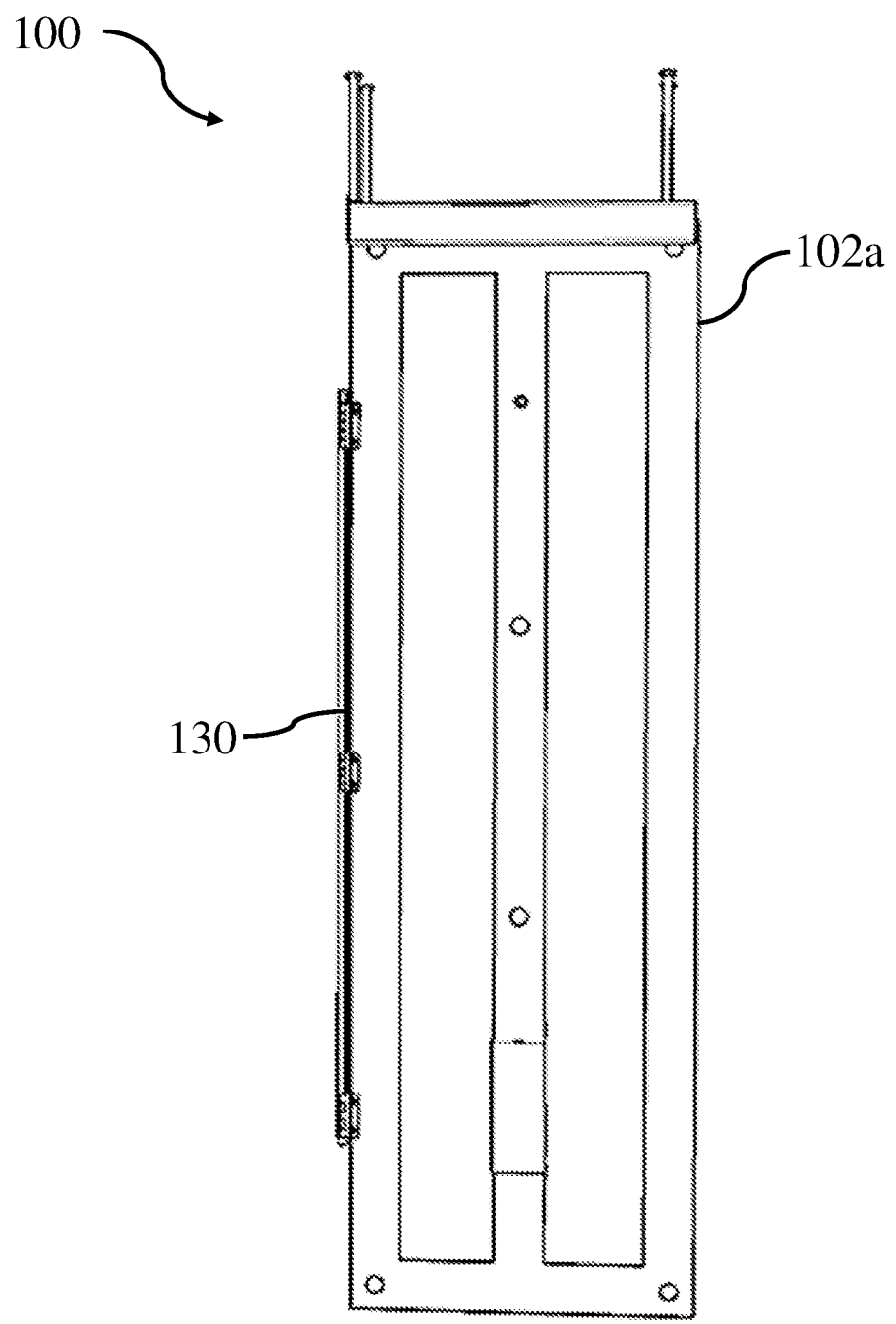
FIG. 1c is a first side view of a cartridge for storing and conveying food items, illustrating a motor (located inside a housing), according to an example embodiment.
Figure 1D:
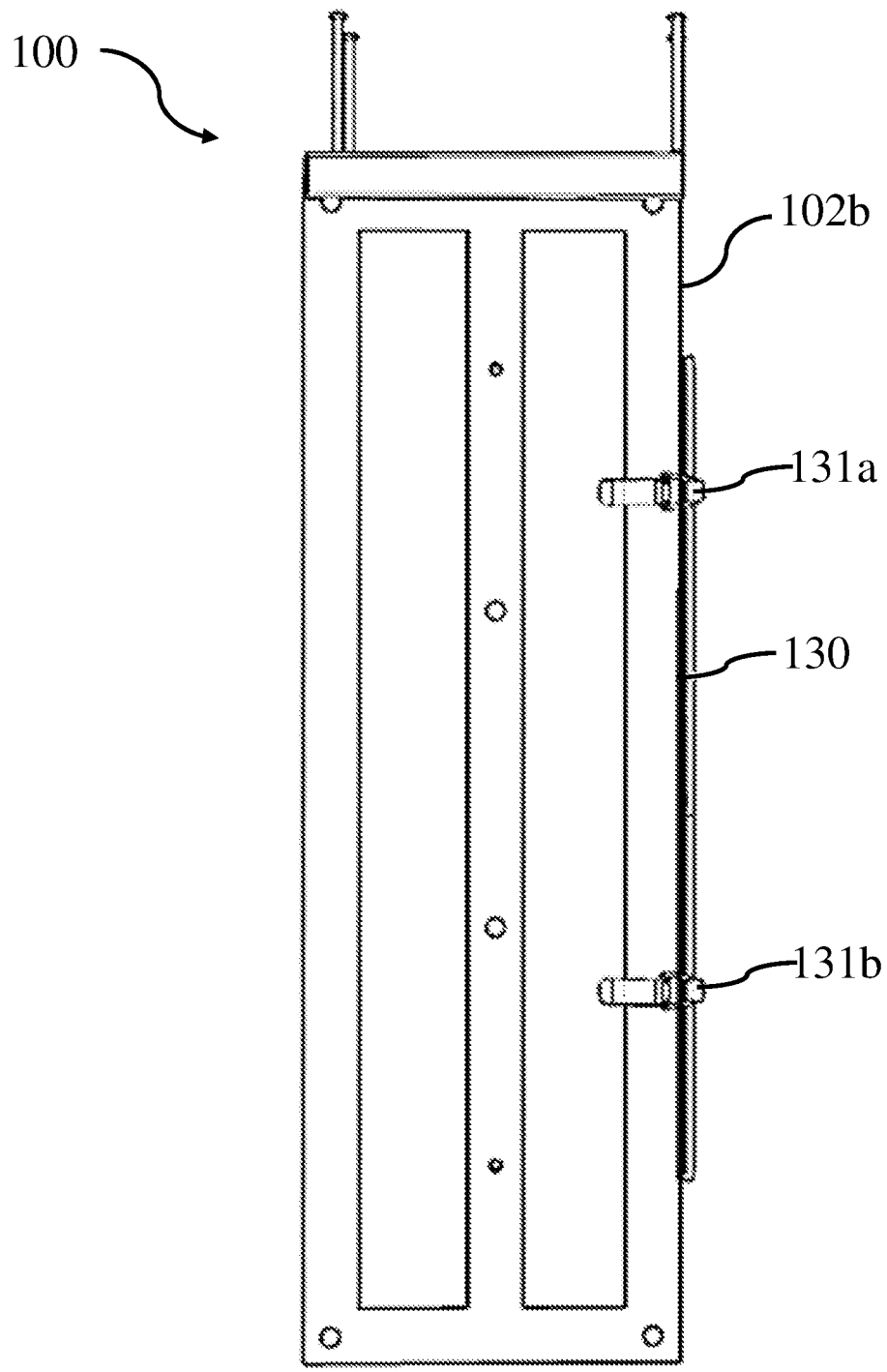
FIG. 1d is a second side view of a cartridge for storing and conveying food items, according to an example embodiment.

Referring now to the Figures, and to FIGS. 1a-1d specifically, a cartridge (100) to be used in a food delivery apparatus is shown. FIG. 1a shows a side view of the cartridge (100), FIG. 1b shows a perspective view of the cartridge (100), FIG. 1c shows a first side view of the cartridge (100) and FIG. 1d shows a second side view of the cartridge. As shown, the cartridge (100) includes a housing (101) defined by a plurality of walls (102a-102b) defining a main cavity (103) inside the housing. In the present embodiment, it is understood that the term cavity or main cavity means a space between the at least two walls. In the present embodiment, the housing only has two walls. However, it is understood that in other emobidments, additional walls or panels may be used and are within the spirit and scope of the present invention. The plurality of walls (102a-102b) may be made of any suitable material. For instance, the walls may be comprised of or consist of a metal or metal alloy, or a polymeric material. Preferably, the walls consist of a metal or metal alloy having a smooth surface that enables rapid and complete sanitization of the surface when necessary. In a preferred embodiment, the walls comprise or consist of an aluminum alloy. For instance, aluminum alloys such as a 1xxx series aluminum alloy, a 3xxx series aluminum alloy, a 5xxx series aluminum alloy, or a 6xxx series aluminum alloy may be used. A stainless steel alloy, such as grades 304, 316, or 400 may also be used. The walls may be sealed with silicone rubber to obtain a hermetic seal.

Figure 2A:
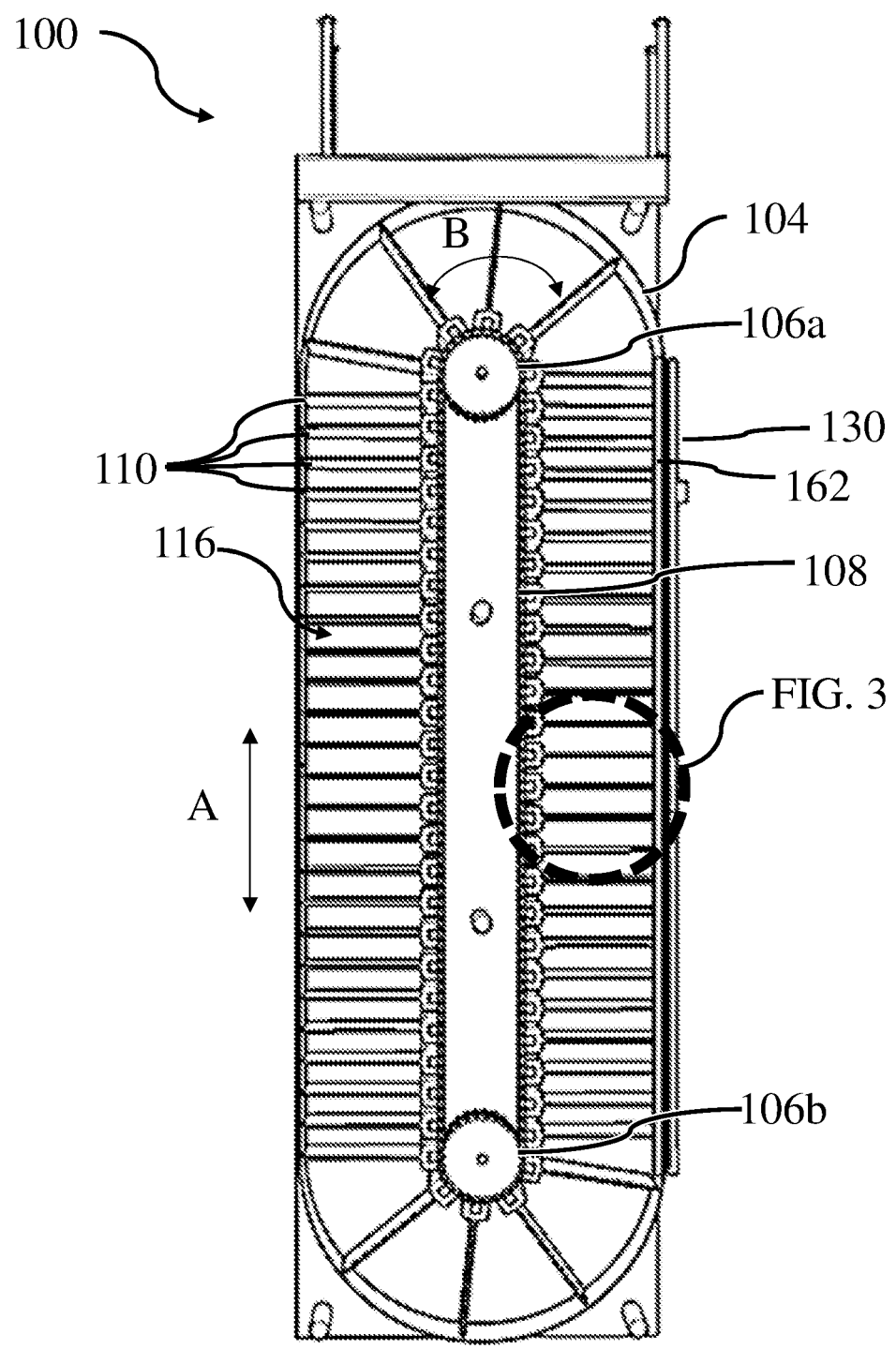
FIG. 2a is a cutaway, side view of a cartridge for storing and conveying food items, according to an example embodiment.

The cartridge also includes a first movable door (130) covering a first opening (131). The first opening provides access to inside the outer looped element between the two walls (102a-102b) of the housing. The food cartridge (100) may be locked using at least one fastener, such as the clasp and clasp hook fasteners (131a and 131b) depicted in the figures. The fasteners may be similarly made of a metal, metal alloy, or polymeric material as described above. The aluminum alloys and stainless steel alloys may be used, for example, as materials in the fasteners. The door (130) provides access to the cartridge when the cartridge (100) is to be filled with food items. As will be described below, the cartridge includes a plurality of movable chambers defined by a plurality of panels for placing the food items. A first portion of the plurality of chambers may be accessed when the door (130) is open and provides access into the chamber via the first opening (131). The movable inner looped element may be rotated, such that the operator can access the second portion of the plurality of chambers, as needed. In one embodiment, an inward facing wall portion (162) of the first movable door (130) at least partially defines the outer looped element and covers a first opening (131) (as illustrated in FIG. 2a). The movable door may include gaskets such that it provides a seal or hermetically sealed chamber.

The cartridge (100) may be mounted in any machine or device for preparing food. In the depicted embodiment, the cartridge (100) is envisioned for use in a vending machine. The cartridge (100) may be mounted within an enclosure. For instance, cartridge (100) may include carriage bolts (142) at an upper end of the cartridge (100) for hanging the cartridge inside of a vending machine. In other embodiments, the cartridge may be fastened or mounted to the vending machine by other means. For example, the cartridge may be mounted by rails to the vending machine. However, other means for mounting or attaching the cartridge to the vending machine may be used and is within the spirit and scope of the present invention. The cartridge design could also allow for the cartridge to rest on a surface, or to be hung using other portions of the cartridge. For instance, spacer rods (144) may be used to hang the cartridge. Moreover, spacer rods (144) provide structure to the device through connection with the walls (102a, 102b). The spacer rods (144) also dampen torsion stresses that may be placed upon the cartridge.

In another aspect of the invention, the cartridge (100) design may use a variety of fasteners that do not require any tool(s) to fasten or unfasten. The use of such fasteners may be necessary to comply with local or national laws and regulations. In this aspect, fasteners such as thumb screws, wing nuts, and cotter pin clips may be used, among others.

Figure 2B:
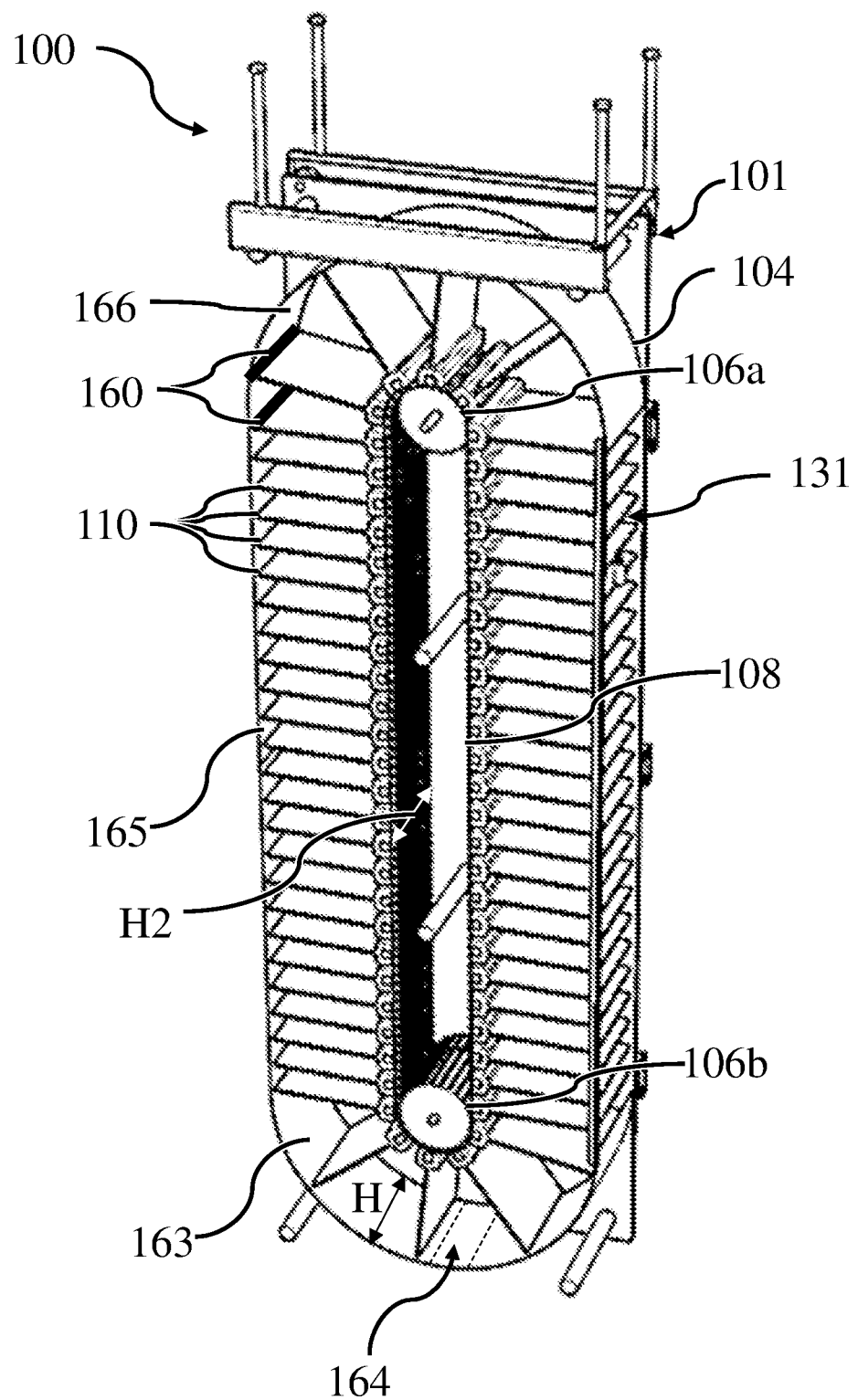
FIG. 2b is a cutaway, perspective side view of a cartridge for storing and conveying food items, according to an example embodiment.

With reference to the figures now including FIGS. 2a-2b, the inner components of the cartridge (100) of FIGS. 1a-1d are shown. In this regard, FIG. 1a shows a front view of the inner components of the cartridge (100), and FIG. 2b shows a perspective view of the inner components. The cartridge as illustrated (100) includes an outer looped element (104) affixed at least partially in the main cavity (103). In one embodiment, the outer looped element (104) is elongated and has a length that spans substantially all of a full length of the housing. Furthermore, the outer looped element (104) has a height H that spans from a first inside surface of a first side wall of one of the plurality of walls (102a) to a second inside surface of a second side wall of one of the plurality of walls (102a). The outer looped element (104) may be rigid. For instance, the outer looped element may be fabricated from any suitable material, such as a metal, metal alloy, or polymeric material. As illustrated in FIG. 2a, the inward facing wall portion (162) of the door (130) at partially defines the inward facing wall of the outer looped element. In one embodiment, the inward facing wall is such that the inward facing wall portion (162) of the first movable door (130) at least partially defines the outer looped element (104) and covers the first opening (131) such that a completely looped shaped element is defined. Additonally, the inward facing wall portion (162) of the first movable door (130) may be configured to be substantially "flush" with the other sections of the inward facing wall (162, 163, 165, 166) of the outer looped element defining the entire looped inward facing wall.

Similar to the outer looped element, the inner looped element (108) has a height (H2) that spans from a first inside surface of a first side wall of one of the plurality of walls (102a) to a second inside surface of a second side wall of one of the plurality of walls (102a) such that the sides of the inner looped element (or seal attached to the inner looped element) create a seal, a hermetic seal or at least a portion of a herrmtic seal of the chamber. In certain embodiments, at least a partially hermictally sealed chamber is formed by combination of (i) the side edges (or sealing elements attached thereto) of the inner looped element (108) abuting the inside surface of the opposing walls, (ii) the second end of the panels (or sealing elements attached thereto) abutting the outer looped element, and (iii) the sides (or sealing elements attached thereto) of the outer looped element abuting the opposing walls. However, it is understood that different variations may be used to provide a hermitcally sealed chamber may be used and are within the spirit and scope of the present invention.

As mentioned above, the aluminum alloy or stainless steel alloy materials may be used. In one embodiment, a 3xxx series aluminum alloy is used. In one embodiment, the aluminum alloy is AA3003. However other materials may be used and are within the spirit and scope of the present invention.

Figure 4A:
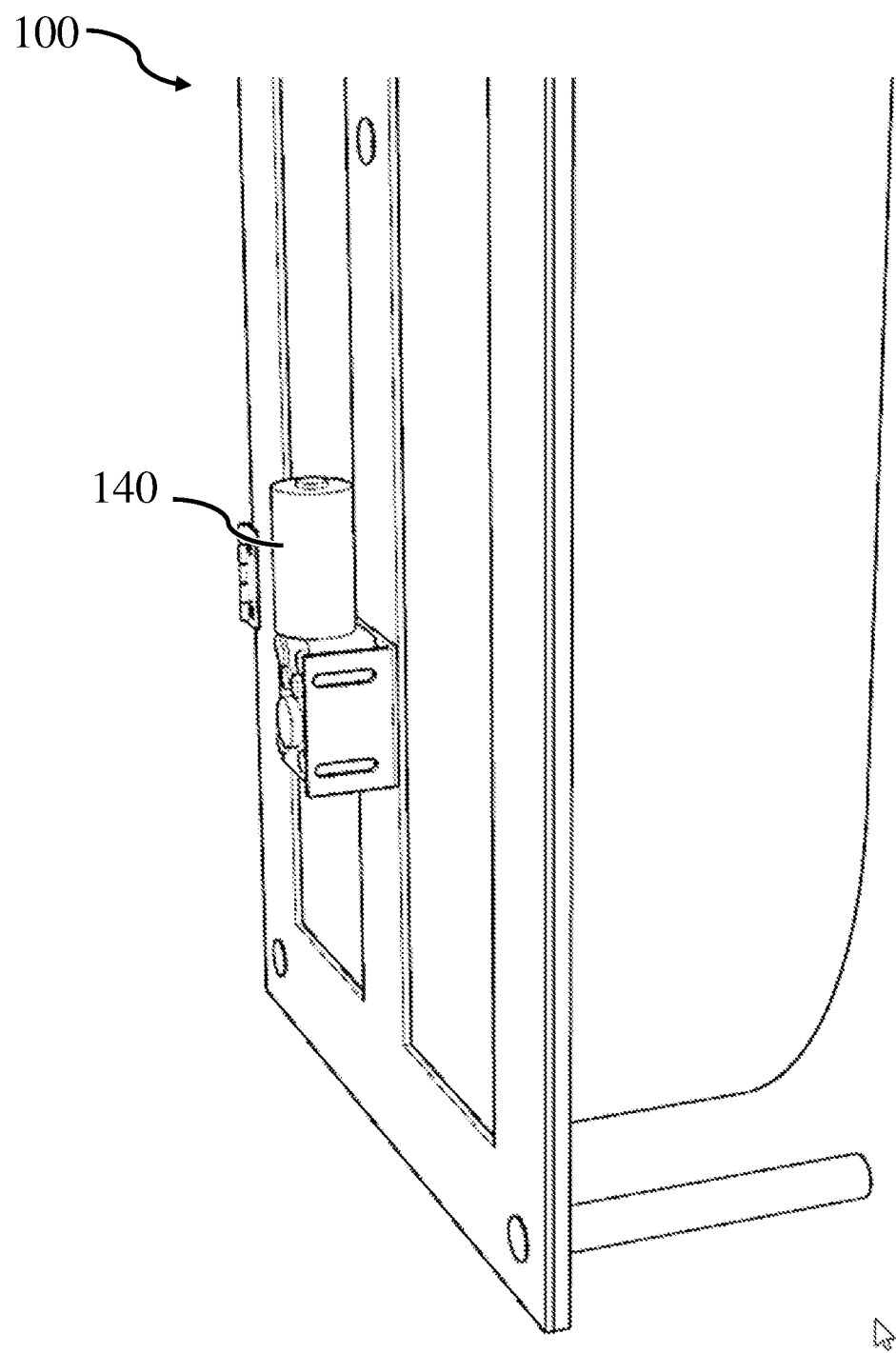
FIG. 4a is a side perspective view of of a cartridge for storing and conveying food items showing a cutaway of the housing for a motor that drive a plurality of rotatable rollers, according to an example embodiment.
Figure 4B:
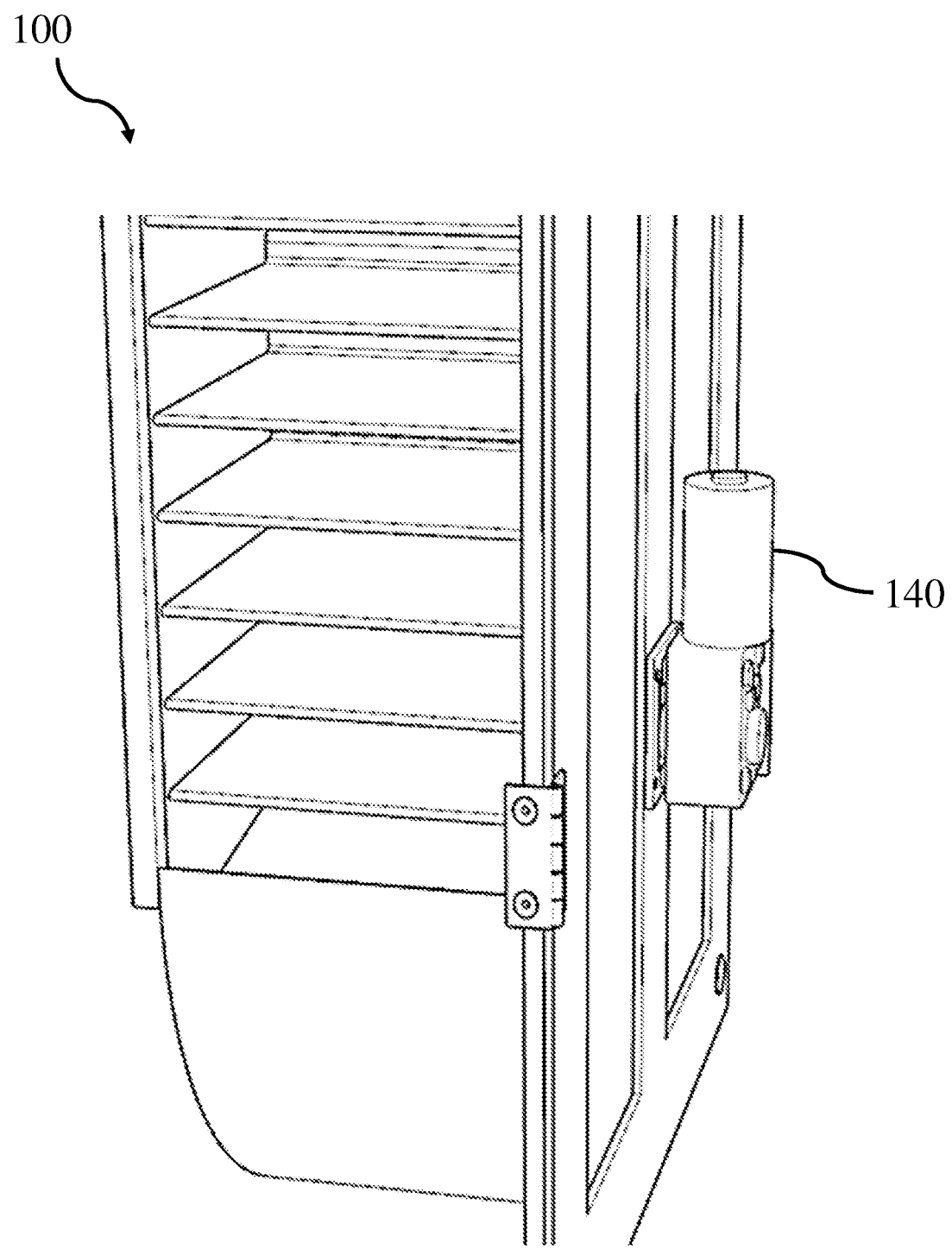
FIG. 4b is a second side view (cutaway) of of a cartridge for storing and conveying food items showing a cutaway of the housing for a motor that drive a plurality of rotatable rollers, according to an example embodiment.

The cartridge (100) also includes a a plurality of rotatable rollers (106a-106b) spaced apart from each other and positioned inside the outer looped element (104), and a movable inner looped element (108) mounted on the plurality of rotatable rollers (106a-106b) and positioned inside the outer looped element (104). The spacing between the rollers may depend on what is being conveyed and the amount of chambers that the cartride requires. However, in other embodiments, a single roller may which is still in the spirt and scope fo the present invention. The cartridge (100) may comprise a motor (140) that when powered rotates at least one of the plurality of rotatable rollers (106a) so that the movable inner looped element (108) moves. By way of example, the motor may rotate the roller (in the either direction illustrated by curved line B) to move the panels and chambers (in the direction illustrated by line A). Motor (140) is shown by FIGS. 4a-4b. The rotatable rollers (106a-106b) may be hermetically sealed to prevent the accumulation of any food particles inside the rollers. Thus, the hermetically sealed rollers (106a-106b) may provide protection against contamination of the food items stored in the cartridge (100).

Figure 3:
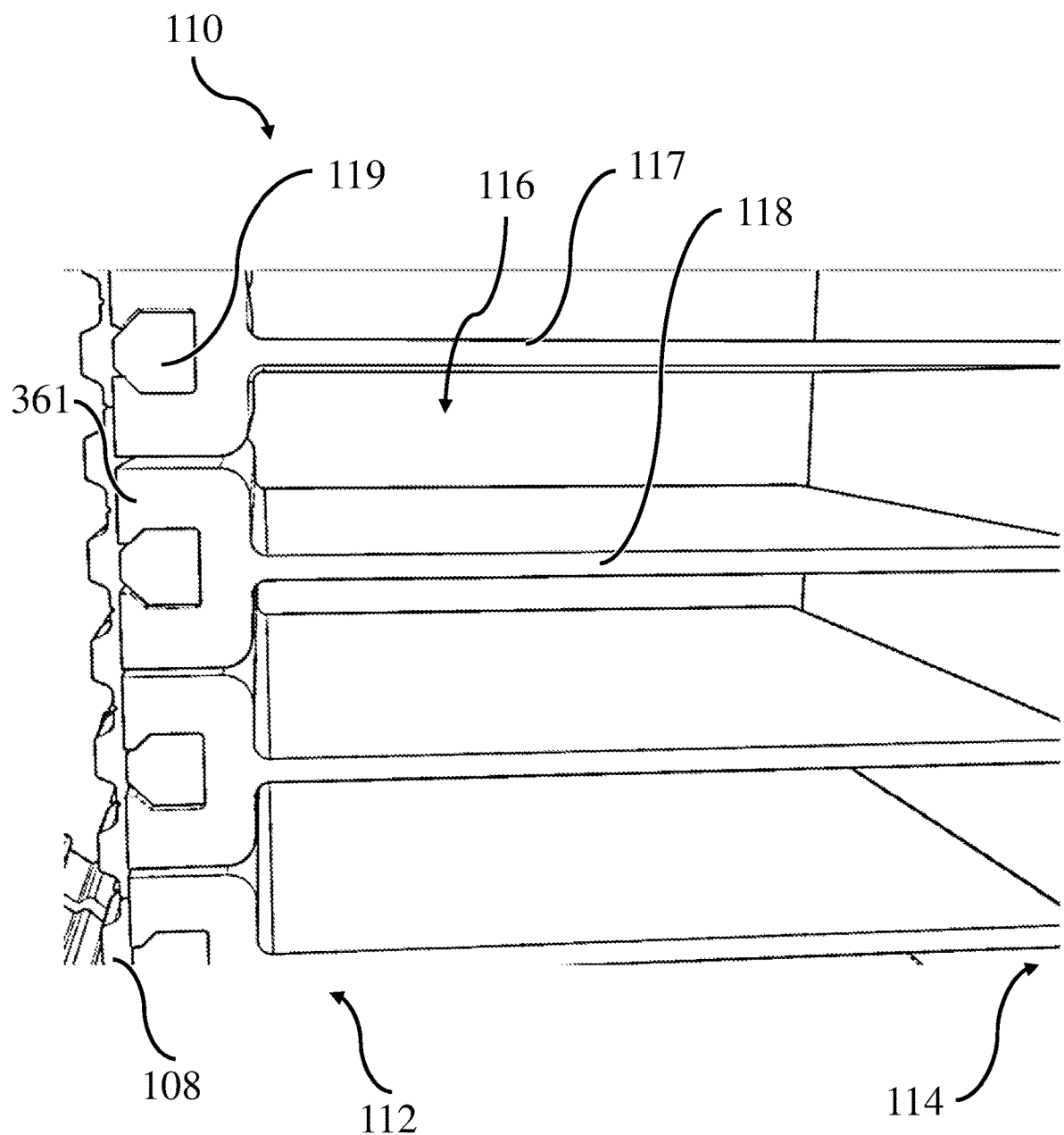
FIG. 3 is a zoomed-in view of the encircled portion of FIG. 2a of a plurality of panels inside of the cartridge for storing and conveying food items, according to an example embodiment.

With reference to the Figures now including FIG. 3, a plurality of panels (110) are shown. The plurality of panels are radially attached to the movable inner looped element (108). As illustrated, a first end (112) of each of the plurality of panels (110) is radially attached to the movable inner looped element (108) such that each of the plurality of panels (110) extends toward the outer looped element (104). A second end (114) of each of the plurality of panels (110) may terminate near, or at the outer looped element (104), and more specifically the inward facing wall of the outer looped element. Thus, a second end (114) of the plurality of panels (110) is at least proximate to an inward facing looped wall of the outer looped element (104). It is understood that in certain embodiemts the second ends of the panels contact or engage the inward facing looped wall. As mentioned before the inward facing looped wall may be partially defined by the inward facing wall (162) of the movable door. Stated differently, the inward facing wall sections (163, 166, 162) may define the inward facing looped wall. The second end (114) of each of the panels (110) may abut the inner side of the outer looped element (104), such that each of the plurality of movable chambers (116) is fully enclosed. In other words, the chamber, which is defined by a set of panels (117, 118), the inward facing looped wall of the outer looped element (104), and the movable inner looped element (108). In certain embodiments, a sealing element (160) may be attached or connected to the second end (114) to each of the panels and the edges that abut the walls of the cartridge so to further assist with faciliting a hermetically sealed chamber. The sealing elements may be an edge trim type seal. The sealing may be an elongated u-shaped body configured to be attached to the edge second on the panel such that mouth of the seal receives the second of the seal and such that the body of the seal contact the inward facing looped wall of the outer looped element. The sealing element may comprise rubber, silicone, or other types of materials confirgured to form a seal. In other embodiments, the side edges of the panels and second ends of the panels may comprise sealing type material that provide the seal or hermetical seal.

Further, the panels (110) may be attached to the movable inner looped element (108) as follows. The movable inner looped element may include a plurality of holes that are vertically and linearly aligned. A transverse row of holes may be used to mount the panels by way of an insert (not illustrated) that secures an attachment (119) to the movable inner looped element (108). Panels (110) may be attached to the movable inner looped element (108) by simply sliding a receiving portion (361) the panel over the attachment (119). In this way, the panels (110) may be readily removed for cleaning from the inner looped element. Lastly, the movable inner looped element (108) may include a recievng portion configed to received a tracking tooth (not illustrated) that prevent the belt from sliding off of the the rollers. Additionally, a sealing portion may be provided on the panels so that when the panels are installed or mounted on the attachment of the inner loop element, the sealing portion of the receiving portions of adjacent panels contact each other providing a further seal. It is also understood that the elements and components of the inner looped element that interfaces with the panels (and the panels themselves) may comprise seals or sealing elements so that a seal is created between engaging surfaces of the inner looped element and each of the panels.

Defined by the plurality panels (110) is a plurality of movable chambers (116). The movable chambers (116) extend between the outer looped element (104) and the movable inner looped element (108) and are defined by a space between a first panel (117) and an adjacent panel (118) that is next to the first panel (117). Each chamber may hold one or more food items when the cartridge is charged with food items. For instance, the food item may be a planar food item, or a food item having at least one planar surface. As a non-limiting embodiment, the food item may be used for a burger vending machine. For instance, a patty (e.g., beef, vegetarian, etc.) may be placed in the chamber. One half of a bun may also be placed in the chamber, or a slice of cheese, to name a few. In another aspect, each of the plurality of movable chambers (116) is a hermetically sealed chamber. This prevents the food items from being contaminated.

Figure 5A:
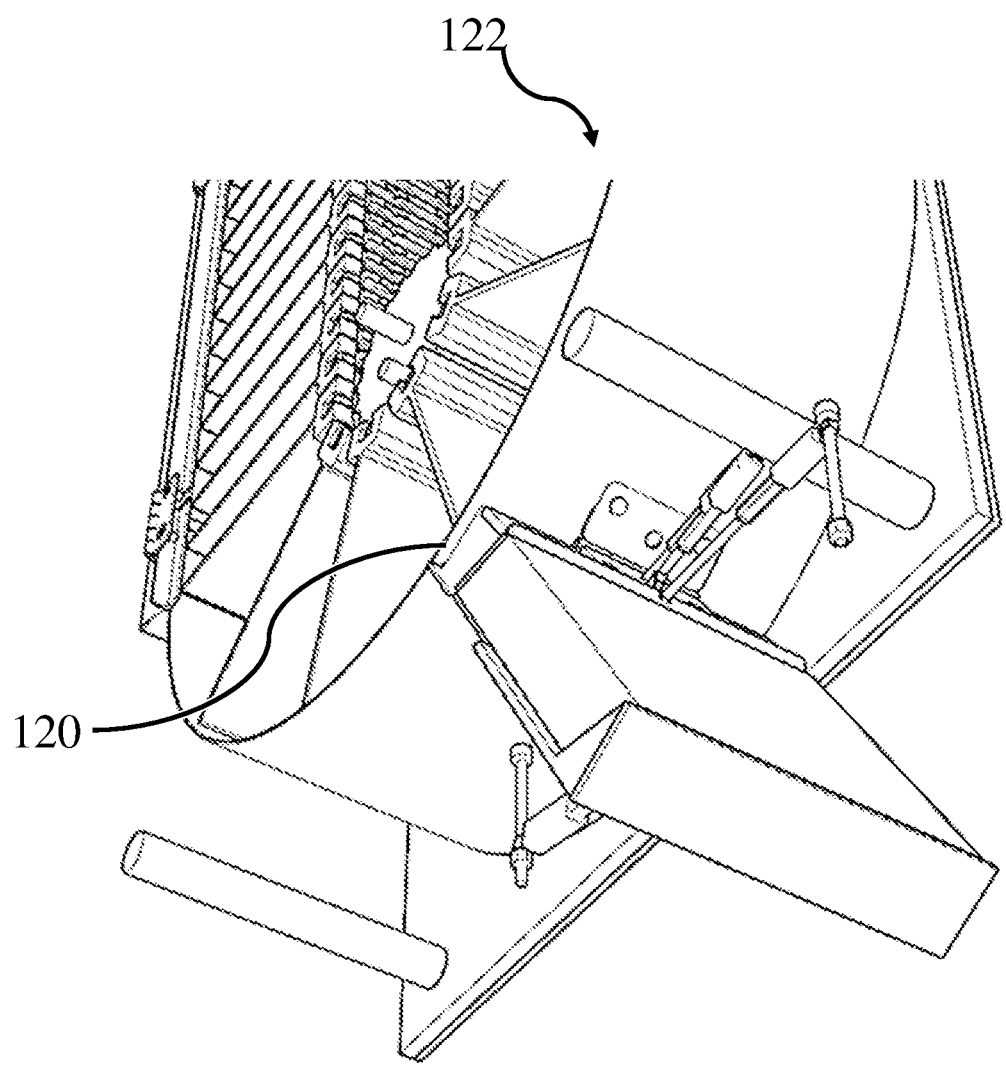
FIG. 5a is a bottom perspective cutaway view of a bottom portion of a cartridge for storing and conveying food items, according to an example embodiment.
Figure 5B:
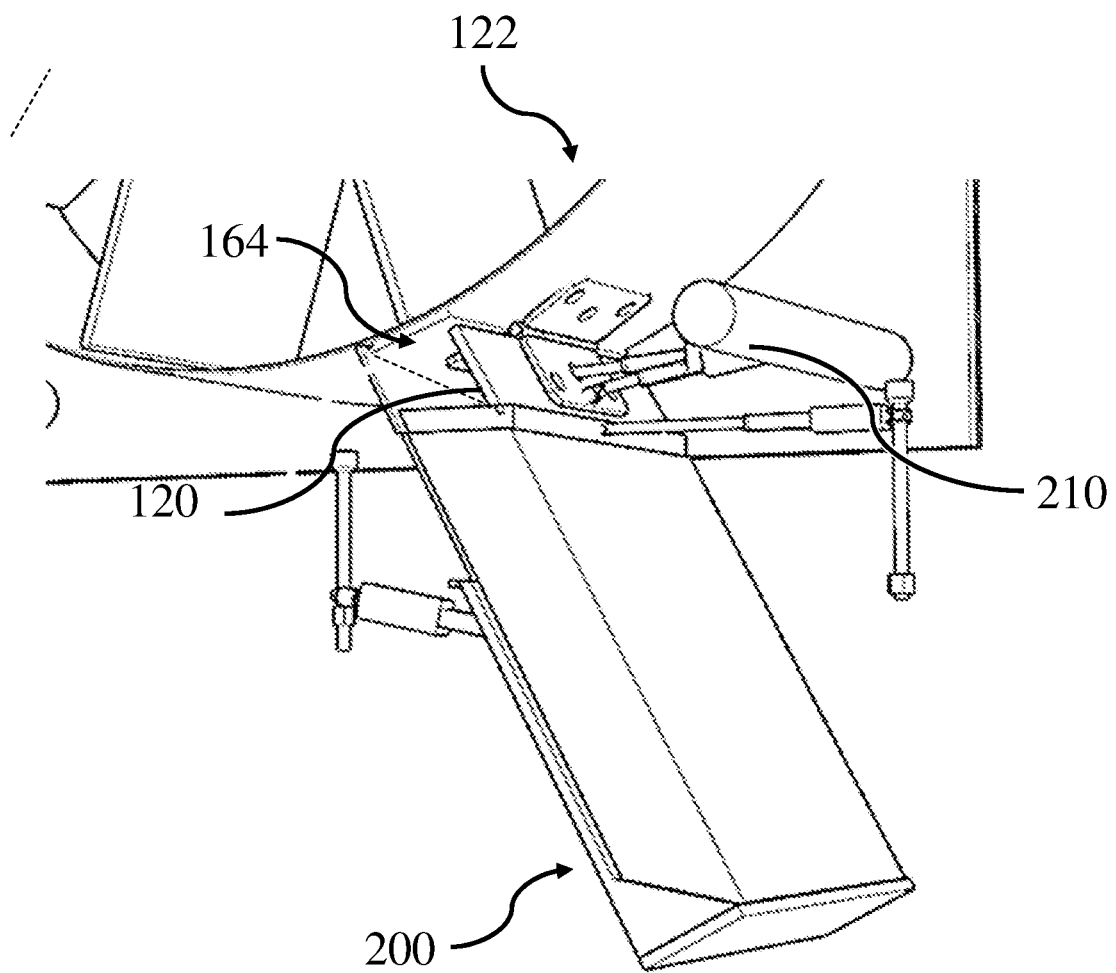
FIG. 5b is a perspective view of a bottom portion of a cartridge for storing and conveying food items, according to an example embodiment.

With reference to the Figures now including FIGS. 5a-5b, a bottom portion of the outer looped element (122) is shown. A second movable door (120) covers an opening (164) that is disposed on the outer looped element (104) that provides access to outside the cartridge (100). The second movable door (120) is disposed on the outer looped element (104) proximate to a bottom end of the outer looped element (104). In this aspect, the movable door (120) enables the cartridge to dispense food items stored inside the cartridge to outside of the cartridge. The shape and size of the second door and opening may be adjusted depending on the size of the food item to be delivered.

The cartridge method of operation includes first charging the cartridge with a plurality of food items. Each food item is stored in a respective chamber. The food items are generally charged into the cartridge in a food safe environment that complies with local laws and regulations that minimize contamination that can cause foodborne illnesses. After charging the cartridge with the food items, the cartridge is sealed. As noted above, one benefit of the cartridge is that the food items are hermetically sealed inside the cartridge. After seallling the cartridge, the cartridge containing the food items therein is then transported to the location that it will be consumed at. For instance, in one embodiment the cartridge is used in a vending machine that serves burgers. In the vending machine, one-by-one, food items are dispensed through the second movable door (120) and opening (164) described above. After a food item is dispensed through the opening (164), the motor (140) engages to move the rotatable rollers, which thereby move the discharged chamber away from the door and a charged chamber to the door. One-by-one, each food item can be dispensed as required by the user. Thus, the cartridge enables on-demand dispensing of food items. The opening (164) may have a shape that may be adjusted for the size of certain food items.

Figure 5C:
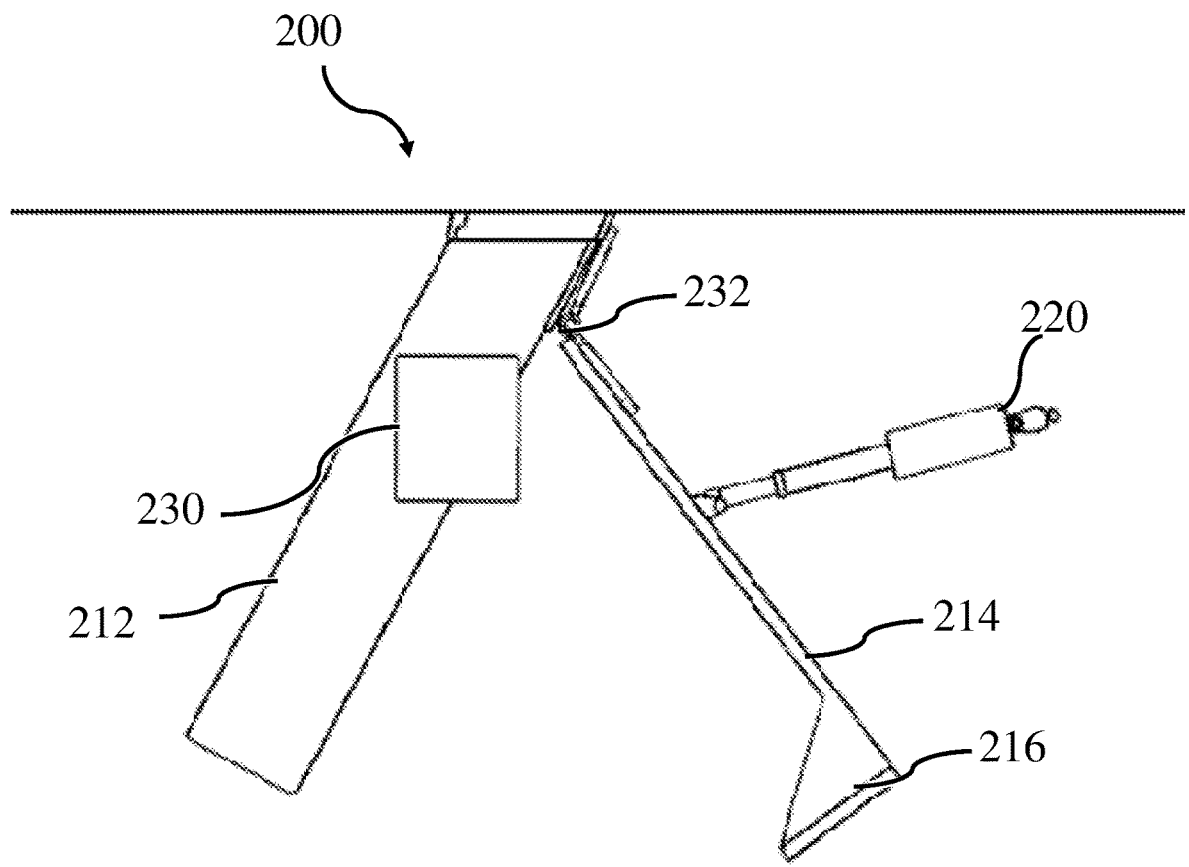
FIG. 5c is a side view of a chute apparatus, according to an example embodiment.

To aid in the discharging of food items, the cartridge may include chute apparatus (200), which is shown most clearly by FIGS. 5b-5c. Chute apparatus (200) is in connection with the door (120), which is opened and closed by a first actuator (210). Chute apparatus (200) includes a chute portion (212) and a hatch portion (214), where the hatch portion (214) is movably engaged with the chute apparatus by a second actuator (220). Chute apparatus may be mounted to the cartridge (100) or other portion of the device that contains the cartridge by a wing (230). Chute apparatus (200) operates by receiving the food item after it has been discharged through the second movable door (120) and opening (164). After receiving the food item, the hatch portion (214) is rotated about a hinged axis (232) to opern the chute apparatus (200). Prior to this rotation, the food item is secured in the foot (216) of the chute apparatus. As the chute portion (214) rotates outward, the food item is gently dropped (using gravity) from the chute apparatus (200).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A cartridge to be removably loaded in a food delivery apparatus, wherein the cartridge is for storing and conveying food items and comprises:
   a housing having a plurality of walls defining a main cavity;
   a outer looped element affixed at least partially in the main cavity, wherein the outer looped element has a length that spans substantially all of a second length of the housing;
   at least one roller positioned inside the outer looped element;
   a movable inner looped element mounted on the at least one roller and positioned inside the outer looped element;
   a plurality of panels, wherein a first end of each of the plurality of panels is radially attached to the movable inner looped element such that each of the plurality of panels extends toward the outer looped element;
   a plurality of movable chambers between the outer looped element and the movable inner looped element, wherein each of the plurality of movable chambers is defined by a space between a first panel of the plurality of panels and an adjacent panel of the plurality of panels that is next to the first panel;
   a first opening that spans substantially all of a first side of the outer looped element;
   a first movable door covering substantially all of the first opening and partially defining the outer looped element when the first movable door is in a first movable door closed position; and
   a second opening disposed on the outer looped element proximate to a bottom end of the outer looped element providing access to outside the cartridge;
   a second movable door covering substantially all of the second opening and partially defining the outer looped element when the second movable door is in a second movable door closed position.

2. The cartridge of claim 1, wherein the cartridge comprises a motor that when powered rotates the at least one rotatable roller so that the movable inner looped element moves.

3. The cartridge of claim 1, wherein at least a portion the outer looped element is rigid.

4. The cartridge of claim 1, wherein the outer looped element has a height that spans from a first inside surface of a first side wall of one of the plurality of walls to a second inside surface of a second side wall of one of the plurality of walls.

5. The cartridge of claim 4, wherein a second end of the plurality of panels is at least proximate to an inward facing looped wall of the outer looped element.

6. The cartridge of claim 5, wherein the second end of each of the panels abuts the inner side of the outer looped element such that each of the plurality of movable chambers is fully enclosed.

7. The cartridge of claim 6, wherein each of the plurality of movable chambers is a hermetically sealed chamber.

8. A cartridge to be removably loaded in a food delivery apparatus, wherein the cartridge is for storing and conveying food items and comprises:
   a housing having a plurality of walls defining a main cavity;
   a outer looped element affixed at least partially in the main cavity, wherein the outer looped element has a length that spans substantially all of a second length of the housing;
   at least one roller positioned inside the outer looped element;
   a movable inner looped element mounted on the at least one roller and positioned inside the outer looped element;
   a plurality of panels, wherein a first end of each of the plurality of panels is radially attached to the movable inner looped element such that each of the plurality of panels extends toward the outer looped element;
   a plurality of movable chambers between the outer looped element and the movable inner looped element, wherein each of the plurality of movable chambers is defined by a space between a first panel of the plurality of panels and an adjacent panel of the plurality of panels that is next to the first panel;
   a first opening that spans substantially all of a first side of the outer looped element;
   a first movable door covering substantially all of the first opening and partially defining the outer looped element when the first movable door is in a first movable door closed position; and
   a second opening disposed on the outer looped element proximate to a bottom end of the outer looped element providing access to outside the cartridge.

9. The cartridge of claim 8, wherein the cartridge comprises a motor that when powered rotates the at least one rotatable roller so that the movable inner looped element moves.

10. The cartridge of claim 9, wherein the outer looped element has a height that spans from a first inside surface of a first side wall of one of the plurality of walls to a second inside surface of a second side wall of one of the plurality of walls.

11. The cartridge of claim 10, wherein a second end of each of the plurality of panels is at least proximate to an inward facing looped wall of the outer looped element.

12. The cartridge of claim 11, wherein the second end of each of the panels abuts the inner side of the outer looped element such that each of the plurality of movable chambers is fully enclosed.

13. A cartridge to be removably loaded in a food delivery apparatus, wherein the cartridge is for storing and conveying food items and comprises:
   a cavity within the cartridge;
   an inward facing looped wall at least partially affixed inside the cartridge;
   at least one rotatable roller inside the inward facing looped wall;
   a movable inner looped element mounted on the at least one rotatable roller and positioned inside the inward facing looped wall;
   a plurality of panels radially attached to the movable inner looped element such that each of the plurality of panels extends toward the inward facing looped wall;
   a plurality of movable chambers between the inward facing looped wall and the movable inner looped element, wherein each of the plurality of movable chambers is defined by a space between a first panel of the plurality of panels and an adjacent panel of the plurality of panels that is next to the first panel;
   an opening disposed on the inward facing looped wall spanning substantially all of a first side of the inward facing looped wall that provides access to outside the cartridge; and
   a movable door at least partially covering an opening on the inward facing looped wall that provides access to outside the cartridge such that when the movable door is in a movable door closed position the movable door partially defines the inward facing wall.

14. The cartridge of claim 13, wherein the cartridge further comprises:
   a second opening is disposed on the inward facing wall proximate to a bottom end of the inward facing wall and provides access to outside the cartridge; and
   a second movable door at least partially defining the inward facing wall and covering the second opening when the second movable door is in a second movable door closed position.

* * * * *